Patented Dec. 6, 1938

2,139,227

UNITED STATES PATENT OFFICE 2,139,227

REMOVING FLUORIDES FROM WATER

Paul C. Goetz, Mount Holly, N. J., assignor to The Permutit Company, New York, N. Y., a corporation of Delaware No Drawing. Application September 12, 1936, Serial No. 100,545

9 Claims. (Cl. 210—24)

This invention relates to removing fluorides from water; and it comprises a process of treating water for the removal of fluorine content wherein flowing water, which may have been previously softened and otherwise purified, is passed into contact with extensive surfaces of a granular gel material adapted to fix and retain fluorine, this material being ordinarily ferric oxide or alumina containing water of hydration and being used as a pervious bed, and the bed is maintained in a state of high efficiency by occasional treatments with an alkali followed by an acid;. all as more fully hereinafter set forth and as claimed.

Small amounts of fluorine compounds are found in many but not all potable waters. Until recently no hygienic significance was attached to this, but it is now recognized that fluorine has some causative relation to mottled teeth. Much study has recently been made of this subject and it seems to be agreed that a fluorine content of more than about 1.5 parts per million (1.5 milligrams per liter) may cause mottled teeth in growing children. On the basis of present knowledge, it may be assumed that a water containing fluorine in amounts above 2 parts per million, calculated as elemental fluorine (F) is not safe while with 1 part or less the flouorine content may be disregarded. Some potable waters otherwise unobjectionable carry as high as 15 to 20 parts of fluorine per million. The state in which the fluorine exists in these waters is not definitely known. It may be present either as a fluoride or as a silicofluoride. Probably the pH is an important factor. Silicofluorides are more stable in an acid liquid. Many natural waters contain silica and all have been in contact with silica.

Ordinary methods of purifying water, zeolite softening, lime soda softening, alum coagulation, etc., are sometimes effective in removing a considerable proportion of the fluorine occurring in natural waters. The results recorded in this relation, however, show a considerable discrepancy. There seems to be a correlation between pH of the water and the particular amount of fluorine which can be removed in any of these ways of treating water. In any event, however, it has been found that the incidental removal of fluorine by ordinary softening methods is rarely efficient enough to bring the fluorine content down to the very low figure of 1.5 parts per million. Perhaps the best results have been obtained by a special treatment with a special material; by the use of activated carbon with a water acidified to give a pH of about 3. This represents a very acid water which is aggressive on piping and difficult to handle; a water which after the fluorine removal must be subsequently neutralized. Fluorine removal by this method is inconvenient and expensive. The amount of fluorine taken up per pound of carbon used to exhaustion is rather small. The same considerations apply to most of the other materials which can be used to fix fluorine contained in flowing water. In all cases the life of the fluorine removing agent is limited and the sheer amount of fluorine taken up is small. Attempts at regeneration always give a material of lowered efficiency. The removal of fluorine in the excessively small quantity in which it is contained in water seems to be, to a certain extent, a mass action; fluorine removal slackens or diminishes when the amount taken up per pound or per cubic foot of material is still quite small.

An object achieved in the present invention is the provision of a method of regenerating or rehabilitating fluorine-removing beds to permit re-use. By the use of the methods described post this can be accomplished, the efficiency of a bed after regeneration being fully restored and this is true of subsequent regenerations. A bed can be used and regenerated in alternation indefinitely long with full fluorine-removing capacity between regenerations.

Some fluorine-removing materials, such as commercial hardened gel oxides, as a matter of fact acquire a heightened activity after the first regeneration.

The use of hydrated oxide materials of one kind or another for removing silica from water is known (Liebknecht 1,860,781). The materials are usually employed in granular form in pervious beds and in practice they are efficient in removing silica. For this purpose the beds can be regenerated by an occasional treatment with alkali to carry forward the silica taken up from the water, the oxides being left with alkalized surfaces.

I have found that pervious beds of this character are not only efficient in removing silica from water but also in removing fluorine. Silica-removing capacity and fluorine-removing capacity are closely related but are not parallel and equal. The fluorine-removing capacity is not reinstated, after exhaustion, by a simple treatment with alkali. I have, however, discovered that if the alkali treatment be followed by an acid wash, the flouorine-removing efficiency of the bed can be kept at a high point and the material used and reused in repeated cycle over indefinitely long periods. The acid wash removes alkali from the granule surfaces and leaves the granules with non-alkaline surfaces. This seems to be necessary in efficient removal of fluorine from water. On the other hand, alkalization is required in removing fluorine from the charged bed. This two-stage method of rehabilitation is used in the present invention.

With a water containing both fluorine and silica both are removed and in rehabilitating or regenerating the bed by the double alkali-acid treatment it again becomes efficient in removing both. As a matter of interesting detail, stored-up silica seems to be removed in the acid wash following the alkali wash while the fluorine departs mainly in the alkali wash, leaving the silica behind.

In using the bed for removing fluorine, removal of silica becomes of subordinate importance. However, there is a removal of silica. In the presence of silica in the water the fluorine-removing capacity of the bed is not quite as great as in its absence. This however merely means more frequent regeneration and since full fluorine removing capacity is reinstated after each regeneration, it is not important.

The fluorine-removing capacity of granular beds of hydrated oxide gels used in the present invention is satisfactorily high in all cases being, as stated, higher with water containing little silica than with those containing much. The presence of 16 to 18 parts per million of silica in the water may halve the capacity of a given bed but even so a cubic foot of gel oxide before its exhaustion will remove 400 to 600 grains of fluorine; a figure which compares satisfactorily with the efficiency of zeolite beds in softening water.

In removing fluorine from water under the present invention it is not necessary to give the water any such abnormal acidity as is used in proposed methods employing activated carbon. The pH of the water in fluorine-removal may be that normal for the particular water; whether it be a raw water or, as is sometimes the case, a water that has been softened by zeolites. Fluorine can be efficiently removed from water having an ordinary $CO_2$ acidity. No preliminary acidification or subsequent neutralization of the water is essential.

The best materials I have found for the removal of fluorine and for use in the present invention are dried granular metallic oxide gels of various kinds. Hydrated ferric oxide dried at 75 to 100° C. works well. Similar preparations made with hydrated alumina are effective. Chromium borate, mixed oxides of iron and manganese and various metal silicates in granular form can be used. In general, the materials useful in removing silica are, as I have found, capable of removing fluorine from water. Bauxite and bog iron ore are cheap and fairly efficient. The main difference comes in rehabilitation of the bed.

In the present invention when the fluorine-removing capacity begins to slacken showing that the bed contains all the fluorine it will readily take up, the flow of water is interrupted and the bed is subjected to the double regenerating treatment described: successive treatments with an alkali solution and with a somewhat acid solution, the bed being rinsed with water after each treatment.

In the alkali wash the strength of the alkali solution and its character are not of vital importance. The minimum pH practically useful is probably about 8.5, although anything above 7 is operative. A 3 per cent solution is a good strength. Good results have been obtained with a 3 per cent solution of NaOH. Solutions of much greater strength are not economical and in the case of some of the oxide materials there may be a slight attacking action. Almost any of the common alkaline reacting materials may be used. Ammonia is a good and convenient alkali for use in this stage of the regeneration.

In the acid wash a substantial acidity is necessary and some salinity is often advantageous and particularly with some oxide gels from which all swelling power has not been removed in drying. An efficient solution for use in the acid wash which I have used contains both sodium acetate and free acetic acid, but is, comparatively, expensive. Quite dilute acetic acid alone gives good results with most gels. I have also used with success many other acids and salts hydrolyzing with development of acidity as, for instance, alum, ferric chloride, ferric sulfate, etc. Commercial alum (sulfate of aluminum) gives solutions which are efficient and are cheap. Quite dilute sulfuric acid is also an economical reagent. In the acid wash the acidity desirable, while not great, is somewhat above that of ordinary water which nearly always has some $CO_2$ acidity. Sufficient acidity, however, can be obtained by gassing the wet bed with $CO_2$. Solutions which I have successfully used are an alum solution with a pH 3.2 to 3.6, 1 percent acetic acid with a pH of 2.7 and an HCl solution containing 100 parts per million; this having a pH of 2.5.

The efficiency, that is the fluorine abstracting powers of a given bed between regenerations, depends somewhat on the reagents used for regeneration. Soda or ammonia, followed by alum give particularly high efficiencies.

It is my impression that the first stage of treatment, with an alkali wash, strips the bed of fluorine and the second an acid wash puts it chemically in a condition to take up fluorine again. In some work with a water containing varying amounts of fluorine and 16 to 18 per million of $SiO_2$, percolation through a regenerated bed reduces the fluorine below 0.5 parts per million and removes the major part of the silica as well. In this work, ammonia was used in the alkali stage of the regeneration treatment and the stored-up silica did not go forward with it but it did go forward in the subsequent acid wash. Stored-up fluorine in this work went forward with the ammonia and the acid wash showed no fluorine. Usually the removal of fluorine is quantitative, the amount of fluorine going forward in the alkali wash usually being about equal to that stored.

After the 2-stage treatment of the oxide bed it is ready to serve anew, having been stripped of fluorine and placed in a condition to take up further fluorine.

One particularly satisfactory way of using the stated process is in connection with certain modern methods of abstracting bases from water containing salines by the use of sulfated lignite and the like. In this method free acid is of course left in the water and by the use of a metallic oxide bed of the character described, this acid can be removed simultaneously with the fluorine content. In other words the bed removes silica, fluorine and acid.

In a practical embodiment of the present invention a cubic foot of granular hydrated alumina was placed in a 9 inch diameter water softener 44 inches high. The alumina was supported on a 6 inch bed of gravel. This softener was a standard commercial softener equipped with a single valve containing multi-ports for carrying out the usual softening, backwashing and regeneration operations and the softener had the usual connections at the top and bottom necessary for carrying out these operations. The equipment was operated downflow for fluorine removal.

Water to be defluorinated was passed through the bed in downflow until fluorine began to appear in the effluent.

The alumina was then regenerated by passing 25 gallons of 3 per cent ammonia through the bed in 45 minutes and then rinsing the bed with approximately the same quantity of raw water. Then 25 gallons of a 10 per cent sodium acetate-acetic acid mixture was passed through the bed of alumina in approximately 45 minutes and the bed again rinsed with about twenty gallons of raw water to remove the adhering acid mixture.

The regenerated bed of alumina was then used to remove fluorides from a 6 grain hard water containing 10 parts per million fluorine. This water was passed through the bed of alumina at 2 gallons per minute, a flow rate which is comparable with that usually used in zeolite water softeners.

The effluent from the alumina was free of fluorine until approximately 800 gallons had passed through and then the fluorine content of the effluent increased rapidly. The fluorine-removal capacity of the one cubic foot bed of alumina was 400 grains fluorine. The bed was then again regenerated as described above and the cycle repeated. The fluorine removal capacity of the bed on the second and subsequent runs was the same as that of the first run. Full capacity remained after 20 runs.

In a similar operation using granular hydrated ferric oxide in defluorinating water, a cubic foot of oxide was placed in a softener of the same type and also working in downflow with the same raw water. When defluorination slackened the bed was regenerated as described ante. After regeneration the bed regained its initial efficiency. This efficiency was higher than that of the hydrated alumina regenerated in the same way. A cubic foot on the average defluorinated 1000 gallons of this particular water between successive regenerations, whereas with the hydrated alumina the capacity was about 800 gallons.

In regenerating used alumina with sodium hydroxide as the alkali in the first step, a 3 per cent solution of caustic soda was used, the procedure and quantities being the same as in the stated use of 3 per cent ammonia. In the second or acid stage of regeneration, instead of the described 25 gallons of 10 per cent sodium acetate-acetic acid, equal results were obtained by the use of 25 gallons of a 2.5° Bé. solution of commercial sulfate of alumina.

In regenerating hydrated alumina with caustic soda and alum a greater defluorinating capacity is obtained, the average amount of the same water which can be defluorinated between regenerations being increased to 1200 gallons. The fluorine-removing capacity of the bed between regenerations amounts to about 600 grains fluorine per cubic foot.

In using oxide beds for removing fluorine it is not necessary to regenerate as frequently as in removing silica and the bed may lose silica extracting capacity prior to regeneration.

While I have spoken more particularly of pervious bed systems, usually with downflow, other modes of operation are possible. It is, for example, possible to defluorinate in upflow with the granules more or less in suspension and not forming an ordinary bed. In defluorinating in downflow, it is usually necessary to backwash the bed from time to time in a well known way.

Fluorine-removing is most necessary with potable water and in the described embodiments of my invention well water is freed of fluorine and much of its silica without other change in its character, its potability not being impaired.

In some installations, however, it is desirable to remove fluorine from water softened in various ways. In such an event, the fluorine-removing unit may be placed in series, either before or after the softening means. Mostly I mount it to take the effluent from the hardness-removing apparatus. Since in removing hardness there is some incidental removal of fluorine, the water going into the defluorinator contains less fluorine and its capacity between regenerations is correspondingly increased. In one particular installation defluorinating water from a soda lime softener, an apparatus of the type of that previously described, containing activated alumina, was mounted to receive the softened water. This softened water contains 5 parts per million of fluorine and the defluorinator treated 2400 gallons of the water per cubic foot of alumina before regeneration was required. In regenerating, sodium hydrate and alum were used as previously described; a similar zeolite softened water, also containing 5 parts per million of fluorine and regenerated with 10 per cent sodium acetate-acetic acid mixture gave a capacity between regenerations of 1600 gallons. A commercial water softened by sulfated lignite preparation still contained 5 parts per million of fluorine and had a marked acidity. Both the acidity and the fluorine were removed using alumina in the bed. The efficiency of the bed between regenerations was about 2400 gallons per cubic foot.

What I claim is:—

1. In the purification of water, a process of removing both acid and fluorine from a water containing both which comprises flowing the water through a pervious bed of granular hydrated metallic oxide in gel form having non-alkaline surfaces with regeneration of said bed from time to time by washing with dilute alkaline solution removing from the bed fluorine and acid taken up from the water and treating the bed with a dilute acid solution to restore its fluorine removing capacity prior to flowing water therethrough.

2. In defluorinating water, passing a flow of water through a pervious bed of a granular hardened hydrated metallic oxide gel and occasionally interrupting the flow of water, washing the bed by a flow of dilute alkaline solution to remove fluorine taken up from the water, then washing the bed by a flow of dilute acid solution of a pH of 6 or less in quantity sufficient to restore the fluorine-removing power of said hydrated oxide and then repeating the flow of water.

3. The process of claim 2 wherein the granular, hard, metallic gel is hydrated ferric oxide.

4. The process of claim 2 wherein the granular, hard metallic gel is hydrated alumina.

5. The process of claim 2 wherein the dilute alkaline solution is ammonia.

6. The process of claim 2 wherein the acid solution contains acetic acid and sodium acetate.

7. The process of claim 2 wherein the acid solution contains aluminum sulfate.

8. A method of purifying water which comprises passing it in contact with sulfated lignite imparting free acidity to the water and then removing free acid and fluorine from the water by passing it in contact with a granular hydrated metallic oxid gel.

9. In removing fluorine from water by aid of a hydrated metallic oxide gel with removal of fluorine from the gel by an alkaline wash, a process of maintaining the fluorine removing capacity of the gel which comprises treating the gel with dilute acid after the alkaline wash and prior to treating water with the gel for removal of fluorine thereby.

PAUL C. GOETZ.